United States Patent
Gendai et al.

(10) Patent No.: US 9,030,586 B2
(45) Date of Patent: May 12, 2015

(54) SOLID-STATE IMAGING DEVICE, DRIVE METHOD THEREOF AND CAMERA SYSTEM

(75) Inventors: Yuji Gendai, Kanagawa (JP); Junji Toyomura, Nagasaki (JP); Norifumi Kanagawa, Nagasaki (JP)

(73) Assignee: Sony Corporation, Tokyo (JP)

( * ) Notice: Subject to any disclaimer, the term of this patent is extended or adjusted under 35 U.S.C. 154(b) by 403 days.

(21) Appl. No.: 13/064,859

(22) Filed: Apr. 21, 2011

(65) Prior Publication Data

US 2011/0267522 A1    Nov. 3, 2011

(30) Foreign Application Priority Data

Apr. 28, 2010   (JP) ............................... P2010-104345

(51) Int. Cl.
H04N 5/225    (2006.01)
H04N 5/335    (2011.01)
H04N 5/378    (2011.01)

(52) U.S. Cl.
CPC ............. *H04N 5/335* (2013.01); *H04N 5/378* (2013.01)

(58) Field of Classification Search
None
See application file for complete search history.

(56) References Cited

U.S. PATENT DOCUMENTS

| 2003/0164443 | A1* | 9/2003 | Henderson .................. 250/208.1 |
| 2003/0179159 | A1 | 9/2003 | Ohsawa et al. |
| 2008/0143860 | A1 | 6/2008 | Sato |
| 2008/0204822 | A1 | 8/2008 | Yamamoto |
| 2008/0239127 | A1* | 10/2008 | Koseki et al. .................. 348/308 |

FOREIGN PATENT DOCUMENTS

| CN | 101207721 A | 6/2008 |
| EP | 1 596 578 A1 | 11/2005 |
| JP | 2008-022259 A | 1/2008 |
| JP | 2008-211540 A | 9/2008 |

OTHER PUBLICATIONS

Extended European Search Report issued Oct. 9, 2012 for corresponding European Application No. 11 16 3519.
Chuang, Ching-Te, "Advanced Bipolar Circuits" Nov. 1992, Circuits & Devices p. 32 to p. 36.
Jouppi, Norman P, et al., A Speed, Power, and Supply Noise Evaluation of ECL Driver Circuits, IEEE Journal of Solid-State Circuits, vol. 31, No. 1, Jan. 1996, p. 32 to p. 45.
Kuroda, Tadahiro et al., "Capacitor-Free Level-Sensitive Pull-Down ECL Circuit with Self-Adjusting Driving Capability" IEEE Journal of Solid-State Circuits, vol. 31, No. 6, Jun. 1996, p. 819 to p. 827.
Ueda, Kimio et al., A Fully Compensated Active Pull-Down ECL Circuit with Self-Adjusting Driving Capabililty, IEEE Journal of Solid-State Circuits, vol. 31, No. 1 Jan. 1996, p. 46 to p. 53.
Chinese Office Action issued Oct. 10, 2014 for corresponding Chinese Application No. 201110107711.5.

* cited by examiner

*Primary Examiner* — Twyler Haskins
*Assistant Examiner* — Dwight C Tejano
(74) *Attorney, Agent, or Firm* — Rader, Fishman & Grauer PLLC

(57) ABSTRACT

A solid-state imaging device includes: pixel signal reading lines; a pixel unit in which pixels including photoelectric conversion elements are arranged; and a pixel signal reading unit performing reading of pixel signals from the pixel unit through the pixel signal reading lines, wherein the pixel signal reading unit includes current source circuits each of which includes a load element as a current source connected to the pixel signal reading line forming a source follower, and the current source circuit includes a circuit generating electric current according to a slew rate of the pixel signal reading line and replicating electric current corresponding to the above electric current to flow in the current source.

21 Claims, 6 Drawing Sheets

FIG.5

SOLID-STATE IMAGING DEVICE, DRIVE METHOD THEREOF AND CAMERA SYSTEM

BACKGROUND OF THE INVENTION

1. Field of the Invention

The present invention relates to a solid-state imaging device typified by a CMOS image sensor, a drive method thereof and a camera system.

2. Description of the Related Art

In recent years, the CMOS image sensor receives attention as a solid-state imaging device (image sensor) as an alternative to a CCD image sensor. There are the following reasons for this.

Dedicated processes are necessary for manufacturing CCD pixels, plural power supply voltages are necessary for the operation and further, it is necessary to coordinate plural peripheral ICs to operate the CCD.

In response to the above, the CMOS image sensor overcomes various problems such that the system becomes extremely complicated in the CCD image sensor.

The CMOS image sensor can use the same manufacturing processes as a common CMOS integrated circuit in manufacture thereof, which can be driven by a single power supply and which can mix an analog circuit and a logic circuit using the CMOS process in the same chip.

Accordingly, the CMOS image sensor has plural important advantages such that the number of the peripheral ICs can be reduced.

As an output circuit of the CCD, a one-channel (ch) output type using a FD amplifier having a floating diffusion (FD) layer is the mainstream.

On the other hand, the CMOS image sensor has FD amplifiers with respect to respective pixels and a column-parallel output type in which a given row in a pixel array is selected and pixels are simultaneously read in a column direction is the mainstream.

This is because it is difficult to obtain sufficient drive capability by the FD amplifiers arranged in the pixels and it is necessary to reduce the data rate so that parallel processing is effective.

In this type of solid-state imaging device, a vertical signal line (pixel signal reading line) transferring signals from pixels which forms a source follower with an amplifier output unit including an amplifier transistor of the pixel is connected to a load element (load MOS) forming a constant current source at the outside of a pixel unit.

It is important to reduce settling time of the vertical signal line transferring signals from pixels in the CMOS image sensor, and various techniques concerning this including the load element (load MOS) have been proposed.

In JP-A-2008-211540 (Patent Document 1), a technique of allowing current to be statically variable in accordance with operation speed is proposed.

In JP-A-2009-22269 (Patent Document 2), a technique of increasing load MOS current temporarily when a control signal of a switching transistor driving the vertical signal line is activated.

Additionally, a "mechanism of automatically increasing current only when necessary" has been studied since about 1990 in a theme of "active pull-down" (refer to Ching-Te Chugang, "Advanced Bipolar. Circuits," Circuits & Devices, pp. 32-36, November 1992 (Non-patent document 1), Jouppi, "A speed, power, and supply noise evaluation of ECL driver circuits," IEEE J. of SC, pp. 38-45, January 1996 (Non-patent Document 2), T. Kuroda, et. al., "Capacitor-free level-sensitive active pull-down ECL circuit with self-adjusting driving capability," IEEE J. of SC, pp. 819-827, June 1996 (Non-patent Document 3), and K. Ueda, et. al., "A fully compensated active pull-down ECL circuit with self-adjusting driving capability," IEEE J. of SC, pp. 46-53, June 1996 (Non-patent Document 4).

These studies chiefly aim at speeding up transfer of binary signals dealt by a logic circuit called ECL (Emitter Coupled Logic) while suppressing the increase of power consumption.

SUMMARY OF THE INVENTION

However, in the technique described in Patent Document 1 that merely increases current, there is a problem that the signal level is lowered across the board and it is difficult to have sufficient dynamic range.

Additionally, large current flows constantly at the high-speed operation. Improvement from a viewpoint of "power consumption per speed" is requested.

The technique described in Patent Document 2 has an advantage that initial movement is speeded up, however, it is necessary to turn off the control signal before settlement to return the current to a steady state, and the final settling operation starts from the state.

It can be expected that the settling time can be reduced as a whole because the second settlement can be started from the state with reduced error, however, it is difficult to control timing and there is concern that the effect varies or will be limited.

The techniques described in Non-Patent Documents 1 to 4 are not assumed to be used for an analog signal in which a settling voltage is significant such as in the load MOS.

Thus, it is desirable to provide a solid-state imaging device, a drive method thereof and a camera system capable of reducing settling time of a load element circuit without causing the increase of power consumption.

According to an embodiment of the invention, there is provided a solid-state imaging device including pixel signal reading lines, a pixel unit in which pixels including photoelectric conversion elements are arranged, and a pixel signal reading unit performing reading of pixel signals from the pixel unit through the pixel signal reading lines, in which the pixel signal reading unit includes a current source circuit including a load element connected to the pixel signal reading line as a current source forming a source follower, and the current source circuit includes a circuit generating electric current according to a slew rate of the pixel signal reading line and replicating the electric current corresponding to the above electric current to flow in the current source.

According to another embodiment of the invention, there is provided a drive method of a solid-state imaging device that generates electric current according to a slew rate of a pixel signal reading line and replicating the electric current corresponding to the above electric current to flow in a current source when reading pixel signals from a pixel unit in which pixels including photoelectric conversion elements are arranged through a pixel signal reading line connected to the current source forming a source follower.

According to still another embodiment of the invention, there is provided a camera system including a solid-state imaging device, and an optical system imaging an object image on the solid-state imaging device, in which the solid-state imaging device includes pixel signal reading lines, a pixel unit in which pixels including photoelectric conversion elements are arranged and a pixel signal reading unit performing reading of pixel signals from the pixel unit through the pixel signal reading lines, and the pixel signal reading unit includes a current source circuit including a load element as a current source connected to the pixel signal reading line forming a source follower, and the current source circuit includes a circuit generating electric current according to a slew rate of the pixel signal reading line and replicating the electric current corresponding to the above electric current to flow in the current source.

According to the embodiments of the invention, settling time of the load element circuit can be reduced without causing the increase of power consumption.

DESCRIPTION OF THE PREFERRED EMBODIMENTS

Hereinafter, embodiments of the invention will be explained with reference to the drawings.

The explanation will be made in the following order.
1. Outline of the entire configuration of a solid-state imaging device (CMOS image sensor)
2. Configuration example of a current source circuit
3. Third Embodiment (configuration example of a camera system)

<1. Outline of the Entire Configuration of a Solid-state Imaging Device (CMOS Image Sensor)>

Figure 1:
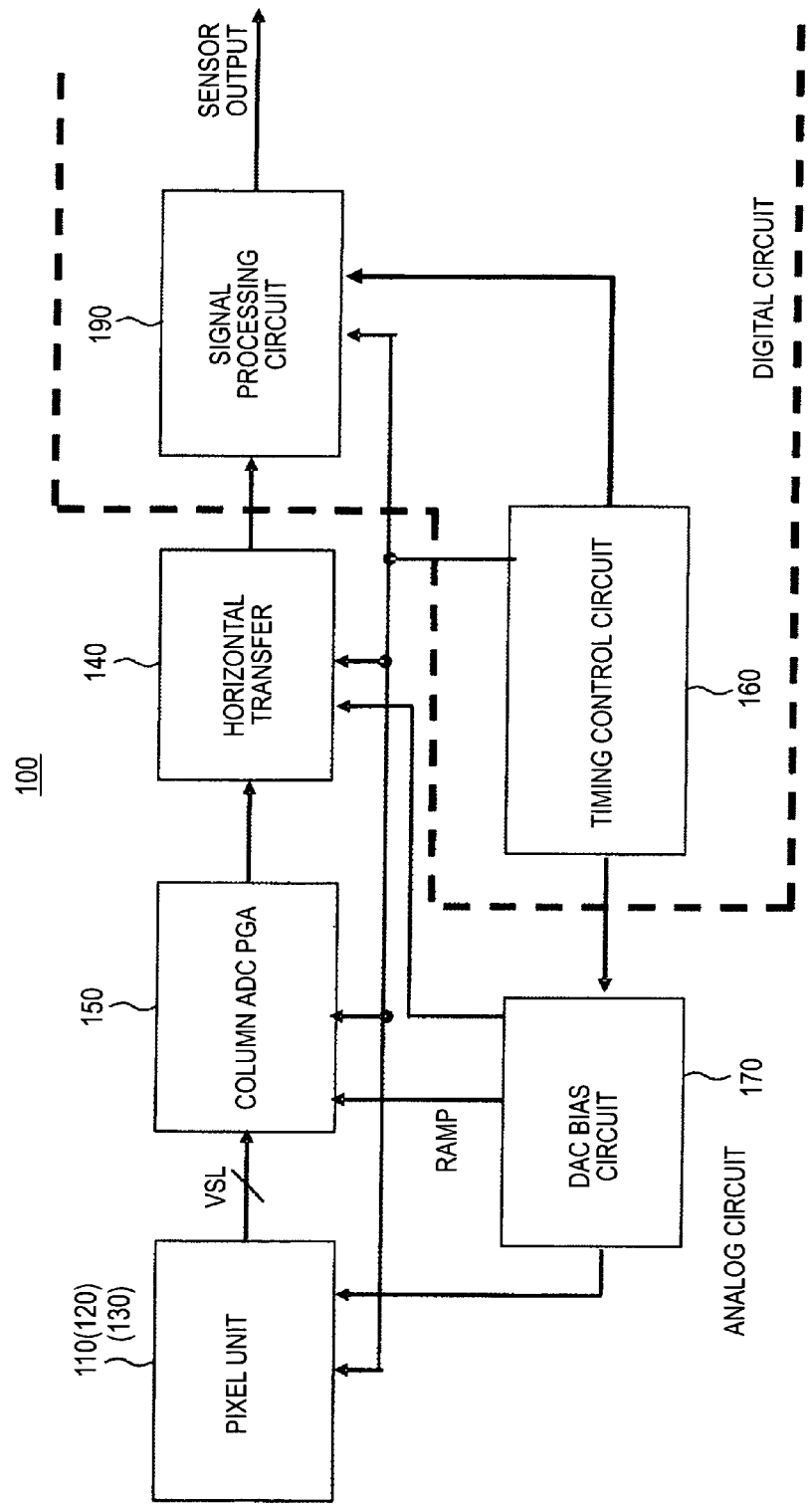
FIG. 1 is a block diagram showing a configuration example of a column-parallel ADC mounted solid-state imaging device (CMOS image sensor) according to an embodiment.

FIG. 1 is a block diagram showing a configuration example of a column-parallel ADC mounted solid-state imaging device (CMOS image sensor) according to an embodiment of the invention.

Figure 2:
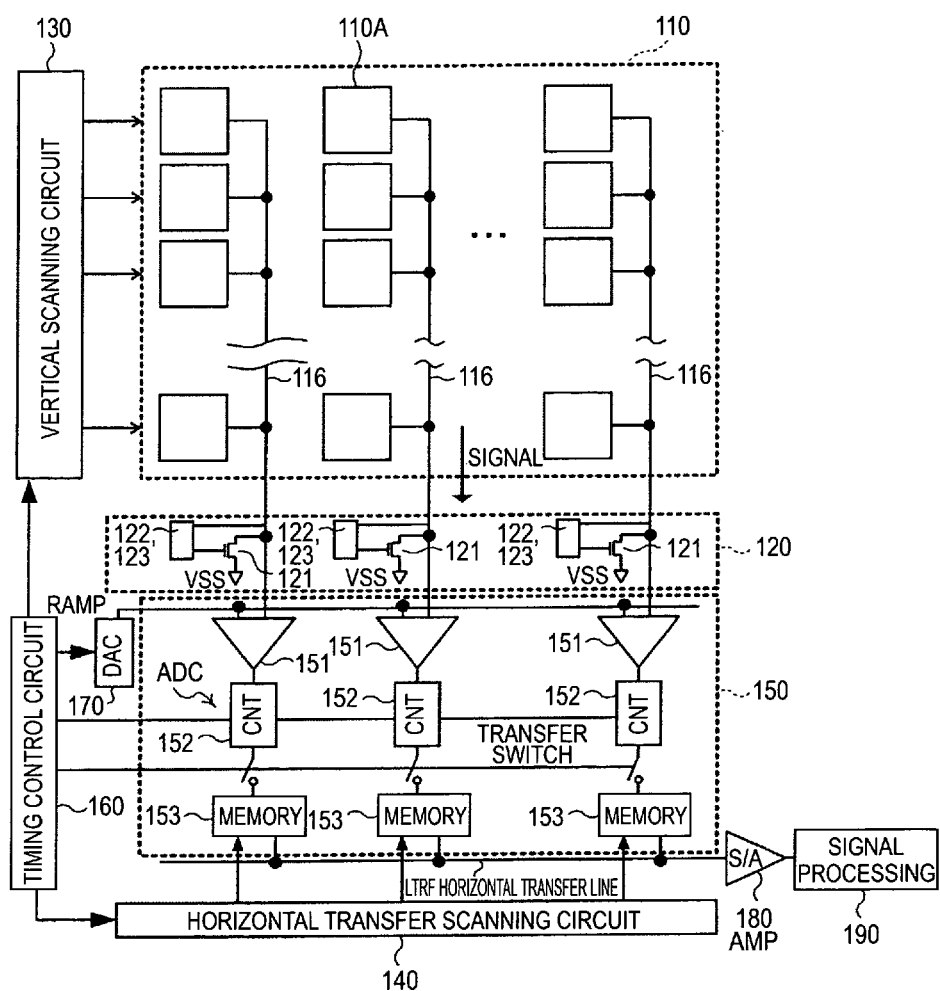
FIG. 2 is a block diagram showing pixels and an ADC group in the column-parallel ADC mounted solid-state imaging device (CMOS image sensor) according to the embodiment more specifically.

FIG. 2 is a block diagram showing pixels and an ADC group in the column-parallel ADC mounted solid-state imaging device (CMOS image sensor) according to the embodiment more specifically.

A solid-state imaging device 100 includes a pixel unit 110, a current source circuit 120, a vertical scanning circuit 130, a horizontal transfer scanning circuit 140, a column processing unit (ADC group) 150 as a pixel signal reading unit and a timing control circuit 160 as shown FIG. 1 and FIG. 2.

The solid-state imaging device 100 includes a DAC bias circuit 170 including a DAC (digital/analog converter), an amplifier circuit (S/A) 180 and a signal processing circuit 190.

In the above components, the pixel unit 110, the power supply circuit 120, the vertical scanning circuit 130, the horizontal transfer scanning circuit 140, the ADC group 150, the DAC 170 and the amplifier circuit (S/A) 180 are formed by analog circuits.

The timing control circuit 160 and the signal processing circuit 190 are formed by digital circuits.

In the embodiment, the column ADC system is applied as an example of the pixel signal reading unit, however, other systems such as a column CDS may be applied, not limited to this system.

In the embodiment, the power source circuit 120 is configured to include a load MOS as a current source forming a source follower.

Also in the embodiment, the CMOS image sensor has a characteristic configuration in which a function to generate electric current according to a slew rate of a signal line is added to the load MOS current source, to which the vertical signal line receiving electric signals from pixels is connected.

As the function of generating electric current according to the slew rate of the signal, a circuit having a source follower transistor and actual capacitance replicating a parasitic capacitance is used, and drain current of the transistor is mirrored to obtain load MOS current in the vertical circuit line.

The characteristic configuration and function of the current source circuit 120 will be described in detail later.

In the pixel unit 110, pixels PXL each having a photodiode as a photoelectric conversion element are arranged in a matrix form.

[Basic Configuration Example of a Pixel]

Figure 3:
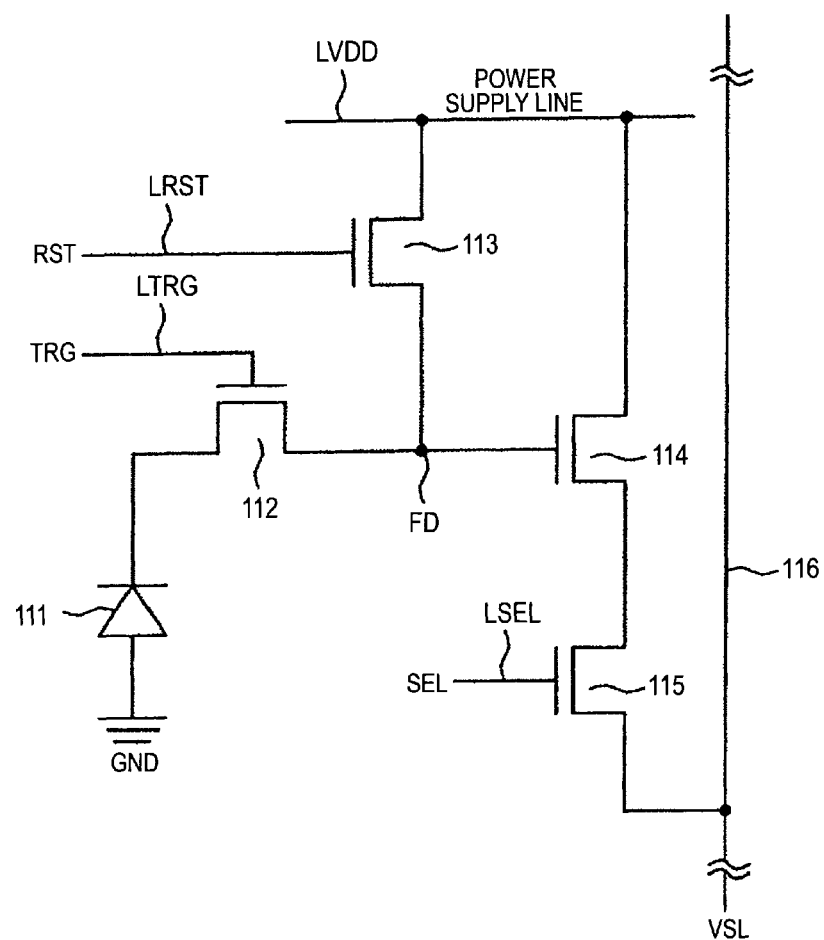
FIG. 3 is a diagram showing an example of a basic pixel circuit of the CMOS image sensor including four transistors according to the embodiment.

FIG. 3 is a diagram showing an example of a basic pixel circuit of the CMOS image sensor including four transistors according to the embodiment.

A pixel circuit 110A of FIG. 3 includes, for example, a photodiode (PD) 111 as a photoelectric conversion element.

The pixel circuit 110A has the photodiode 111 as a photoelectric conversion element.

The pixel circuit 110A includes four transistors as active elements which are a transfer transistor 112 as a transfer element, a reset transistor 113 as a reset element, an amplifier transistor 114 and a selection transistor 115 with respect to one photodiode 111.

The photodiode 111 photoelectrically converts incident light into charges (electrons in this case) corresponding to the amount of light.

The transfer transistor 112 is connected between the photodiode 111 and a floating diffusion FD as an output node.

The transfer transistor 112 transfers electrons obtained by photoelectric conversion in the photodiode 111 to the floating diffusion FD by a transfer signal TRG given to a gate thereof (transfer gate) through a transfer control line LTRG.

The reset transistor 113 is connected between a power supply line LVDD and the floating diffusion FD.

The reset transistor 113 resets a potential of the floating diffusion FD to a potential of the power supply line LVDD by a reset signal RST given to a gate thereof through a reset control line LRST.

A gate of the amplifier transistor 114 is connected to the floating diffusion FD.

The amplifier transistor 114 is connected to a vertical signal line 116 through the selection transistor 115, forming the source follower with the load MOS of the current source circuit 120 forming a constant current source at the outside of a pixel unit.

Then, a control signal (an address signal or a select signal) SEL is given to a gate of the selection transistor 115 through a selection control line LSEL to thereby turn on the selection transistor 115.

When the selection transistor 115 is turned on, the amplifier transistor 114 amplifies the potential of the floating diffusion FD and outputs a voltage corresponding to the potential to the vertical signal line 116. The voltage outputted from each pixel through the vertical signal line 116 is outputted to the ADC group 150 as a pixel signal reading unit.

These operations are performed at respective pixels in one row at the same time because, for example, respective gates of the transfer transistor 112, the reset transistor 113 and the selection transistor 115 are connected in row units.

As shown in FIG. 2, a load MOS transistor 121 as a load element arranged in each column of the pixel arrangement is connected to the vertical signal line 116 in the current source circuit 120 forming the pixel reading unit with the ADC group.

The load MOS transistor 121 is formed by an NMOS transistor which is, for example, an n-channel insulating-gate field effect transistor as a first conductive type.

A drain of the load MOS transistor 121 is connected to the vertical signal line 116 and a source thereof is connected to a reference potential source VSS.

In the current source circuit 120 of the embodiment, a replica circuit 122 having a function of generating electric current according to a slew rate of the signal line to flow is connected to each load MOS transistor 121 arranged in each column.

The load MOS will be the current source (current sink) allowed to flow in the selection transistor 115 of the pixel. If connection positions of the selection transistor 115 and the amplifier transistor 114 are reversed, the embodiment of the invention has the same effects.

<2. Configuration Example of a Current Source Circuit>

Figure 4:
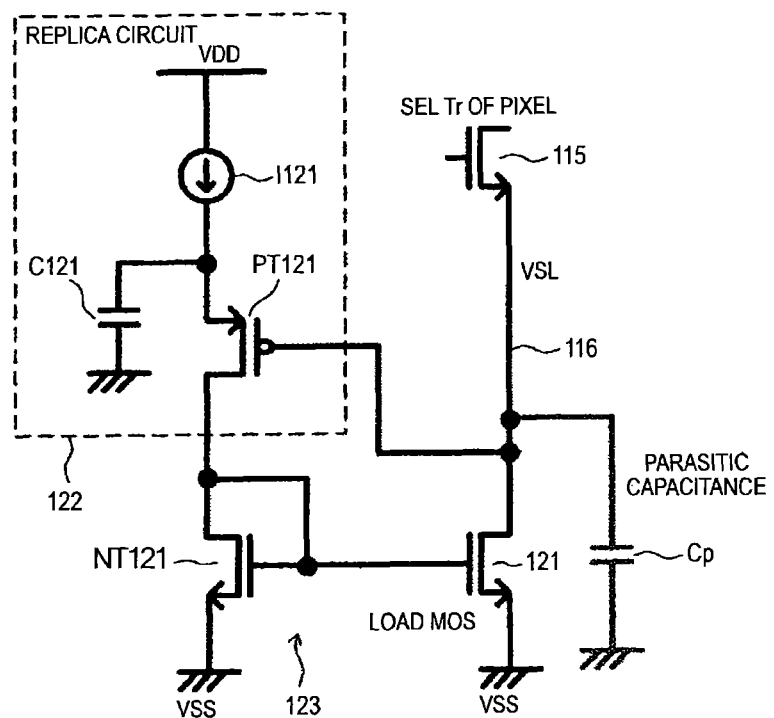
FIG. 4 is a circuit diagram showing a specific configuration example of each load element unit of the current source circuit according to the embodiment.

FIG. 4 is a circuit diagram showing a specific configuration example of each load element unit of the current source circuit according to the embodiment.

Figure 5:
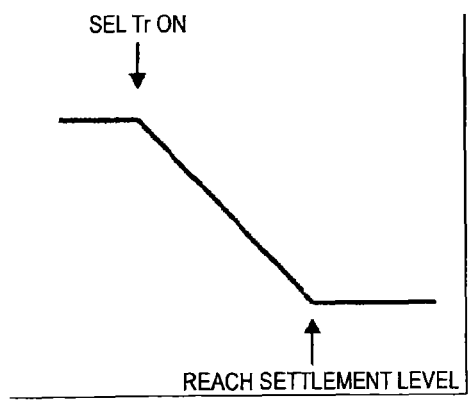
FIG. 5 is a view showing state transition from the turning on of a selection transistor of the pixel until a vertical signal line becomes a settlement level.

FIG. 5 is a view showing state transition from the turning on of the selection transistor of the pixel until the vertical signal line becomes a settlement level.

Each load element unit 120A of the current source circuit 120 is configured to include the load MOS transistor 121 as a first source follower transistor forming the current source, the replica circuit 122 and a current mirror circuit 123.

In the embodiment, an n-type is taken as a first conductive type and a p-type is taken as a second conductive type.

The replica circuit 122 is configured to include a current source I121, a PMOS transistor PT121 as a second source follower transistor and a capacitor (actual capacitance) C121.

The current mirror circuit 123 includes an NMOS transistor NT121 and the load MOS transistor 121.

A gate of the PMOS transistor PT121 is connected to a connection portion between the load MOS transistor 121 and the vertical signal line 116, a source thereof is connected to the current source I121 and a drain thereof is connected to a drain and a gate of the NMOS transistor NT121.

The current source I121 is connected to a power supply VDD and the actual capacitance (capacitor) C121 is connected between the source of the PMOS transistor PT121 and a reference potential (for example, a ground potential) VSS.

A source of the NMOS transistor NT121 forming the current mirror circuit 123 is connected the reference potential VSS, and the gate and the drain thereof are connected to a gate of the load MOS transistor 121.

When the selection transistor (SEL Tr) 115 of the pixel 110A is turned on, the vertical signal line 116 continues decreasing until reaching the settlement level as shown in FIG. 5.

A significant amount of parasitic capacitance Cp is added to the vertical signal line 116, therefore, electric current flows from the parasitic capacitance Cp to the vertical signal line 116.

In a common load MOS circuit, electric current of the load MOS is constant, therefore, the electric current thereof flows into the selection transistor 115.

Therefore, a gate/source voltage VGS is reduced and falling timing is delayed accordingly.

The effects are reduced by allowing sufficient steady current to flow in the load MOS in the past.

When the load element unit 120A according to the embodiment is applied, the voltage of the vertical signal line 116 is monitored by the source follower formed by the PMOS transistor 121.

When the potential of the vertical signal line 116 starts to decrease, a source voltage of the PMOS transistor PT121 decreases at the same rate.

The capacitor C121 is applied as actual loading, current in proportion to the slew rate flows into the capacitor.

The total sum of original operation current of the source follower and current to be charged at the capacitor C121 flows into the drain of the PMOS transistor PT121.

The current is mirrored by the current mirror circuit 123 to generate current of the load MOS transistor 121 to thereby increase current of the load MOS transistor 121 in accordance with the falling of the potential of the vertical signal line 116.

The source follower of the PMOS transistor PT121 is a replica circuit in which polarity of the source follower formed by the selection transistor 115 and the load MOS transistor 121 is inverted when seen from a certain point of view.

As a circuit constant in the simplest manner, a current mirror rate is set to 1:1 and the actual capacitance C121 is equal to the parasitic capacitance Cp.

Accordingly, current flowing in the parasitic capacitance Cp matches to the current flow in the actual capacitance C121, as a result, current flowing in the selection transistor 115 can be constant regardless of the slew rate.

Then, the variation of the gate voltage in the selection transistor 115 is directly transmitted to the vertical signal line 116 to thereby largely alleviate settling time.

As far as the current mirror ratio and the ratio between the actual capacitance C121 and the parasitic capacitance Cp are equal, the same result can be obtained. For example, when the ratios are 1:2, current to flow in the PMOS transistor PT121 becomes half and the actual capacitance C121 also becomes half, as a result, low power consumption and the small area can be realized.

It is also possible to reduce current in the steady state when the same settling time in the past is allowed. It is possible to reduce the total power consumption by applying the invention even when considering current flowing in the current mirror.

Figure 6:
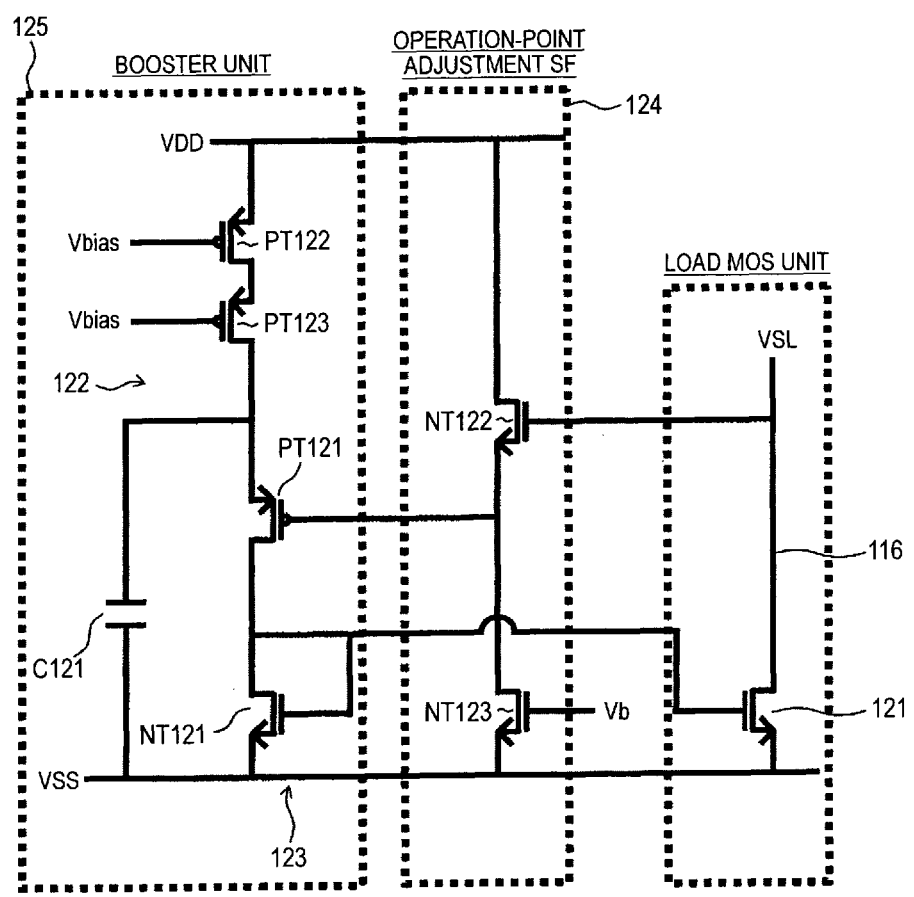
FIG. 6 is a circuit diagram showing another specific configuration example of each load element unit of the current source circuit according to the embodiment.

FIG. 6 is a circuit diagram showing another specific configuration example of each load element unit of the current source circuit according to the embodiment.

A load element unit 120B of FIG. 6 differs from the load element unit 120A of FIG. 4 in the following points.

In the load element unit 120B, a current source of the replica circuit 122 is formed by two PMOS transistors PT122, PT123 which are cascode connected.

When the current source with the cascade is used in the replica circuit, variation in steady current is reduced.

In this case, a source follower 124 for operation point adjustment of the NMOS transistor is inserted therebetween for securing the operation range.

Additionally, a booster unit 125 is formed by including the replica circuit 122 and the current mirror circuit 123.

The operation-point adjustment source follower 124 includes an NMOS transistor NT122 as a third source follower transistor and an NMOS transistor NT123 forming the current source.

A gate of the NMOS transistor NT122 is connected to the vertical signal line 116, a source thereof is connected to the power supply VDD and a drain thereof is connected to a drain of the NMOS transistor NT123 and a gate of the PMOS transistor PT121 of the replica circuit 122.

A source of the NMOS transistor NT123 is connected to the reference potential VSS and a gate thereof is connected to a given bias power supply Vb.

It is also possible to apply a modification example in which the NMOS transistor is used in the replica circuit.

In the embodiment, the capacitor C121 of the replica circuit 122 is connected to a ground potential GND which is the reference potential.

This is because it is effective for the actual capacitance C121 drawing and neutralizing part or all of an increase amount of current allowed to flow in the load MOS transistor 121.

As described above, the CMOS image sensor 100 according to the embodiment includes the current source circuit 120 to thereby reduce the settling time of the load MOS circuit without causing the increase of power consumption. Conversely, there is a noticeable effect that power consumption can be reduced while keeping the settling time.

The solid-state imaging device 100 is provided with the timing control circuit 160 generating internal clocks as a control circuit for sequentially reading signals of the pixel unit 110, the vertical scanning circuit 130 controlling row address and row scanning and the horizontal transfer scanning circuit 140 controlling column addresses and column scanning.

The timing control circuit 160 generates timing signals necessary for signal processing in the pixel unit 110, the vertical scanning circuit 130, the horizontal transfer scanning circuit 140, the ADC group (column ADC circuit) 150, the DAC 170 and the signal processing circuit 190.

In the pixel unit 110, video or a screen image is photoelectrically converted in pixel row units by accumulating and discharging photons using a line shutter to output analog signals VSL to the ADC group.

In the ADC group 150, APGA compliant integrating ADC using a ramp signal RAMP from the DAC 170 and digital CDS are performed to the analog outputs of the pixel unit 110 at respective ADC blocks (respective column units) of the ADC group to output digital signals of several bits.

The ADC in the ADC group 150 includes a comparator 151.

The comparator 151 compares a reference voltage Vslop which is a ramp waveform (RAMP) in which the reference voltage generated by the DAC 170 is changed in a staircase pattern with the analog signal (potential VSL) obtained from pixels in each row through the vertical signal line.

Each ADC further includes a counter 152 counting comparison time and a memory (latch) 153 storing counted results.

The ADC group 150 has a conversion function of n-bit digital signals, in which column parallel ADC blocks are formed with respect to each vertical signal line (reading line).

The output of each memory (latch) 153 is connected to a horizontal transfer line LTRF having 2n-bit width.

Additionally, 2n-pieces of amplifier circuit 180 and the signal processing circuit 190 corresponding to the horizontal transfer lines LTRF are arranged.

In the ADC group 150, the analog signal (potential VSL) read to the vertical signal line 116 is compared with the reference voltage Vslop (the ramp signal RAMP having a slope waveform linearly varying with a certain gradient) at the comparator 151 arranged with respect to each column.

At this time, the counter 152 arranged with respect to each column in the same manner as the comparator 151 operates, and the ramp signal RAMP (potential Vslop) having the ramp waveform and the counter value vary so as to correspond to each other, thereby converting the potential VSL of the vertical signal line into a digital signal.

In the ADC, variation of the reference voltage Vslop (ramp signal RAMP) indicates that variation of voltage is converted into variation of time, and the time is counted by a certain period (clocks) to thereby perform conversion into a digital value.

Then, when the analog signal VSL crosses the ramp signal RAMP (reference voltage Vslop), the output of the comparator 151 is inverted and an input clock of the counter clock 152 is stopped, or the clock the input of which has been stopped is inputted to the counter 152 to complete AD conversion.

After the AD conversion period is completed, data stored in the memory (latch) 153 is transferred to the horizontal transfer line LTRF by the horizontal transfer scanning circuit 140 and inputted to the signal processing circuit 190 through the amplifier circuit 180 to thereby generate a two-dimensional image by given signal processing.

In the horizontal transfer scanning circuit 140, multi-channel simultaneous parallel transfer is performed for securing transfer speed.

In the timing control circuit 160, timings necessary for signal processing in respective blocks such as the pixel unit 110 and the ADC group 150 are generated.

In the signal processing circuit 190 of the subsequent stage, correction of vertical line defects and point defects and signal clamping are performed from the read signals or digital signal processing such as parallel/serial conversion, compression, encoding, addition, average and intermittent operation are performed.

In the solid-state imaging device 100 according to the embodiment of the invention, the digital output of the signal processing circuit 190 is transmitted as an input of an ISP or a baseband LSI.

As described above, the settling time of the load MOS circuit can be reduced without causing the increase of power consumption according to the embodiment. Conversely, there is a noticeable effect that power consumption can be reduced while keeping the settling time.

The solid-state imaging device having the above advantages can be applied as an imaging device of a digital camera and a video camera.

<3. Configuration Example of a Camera System>

Figure 7:
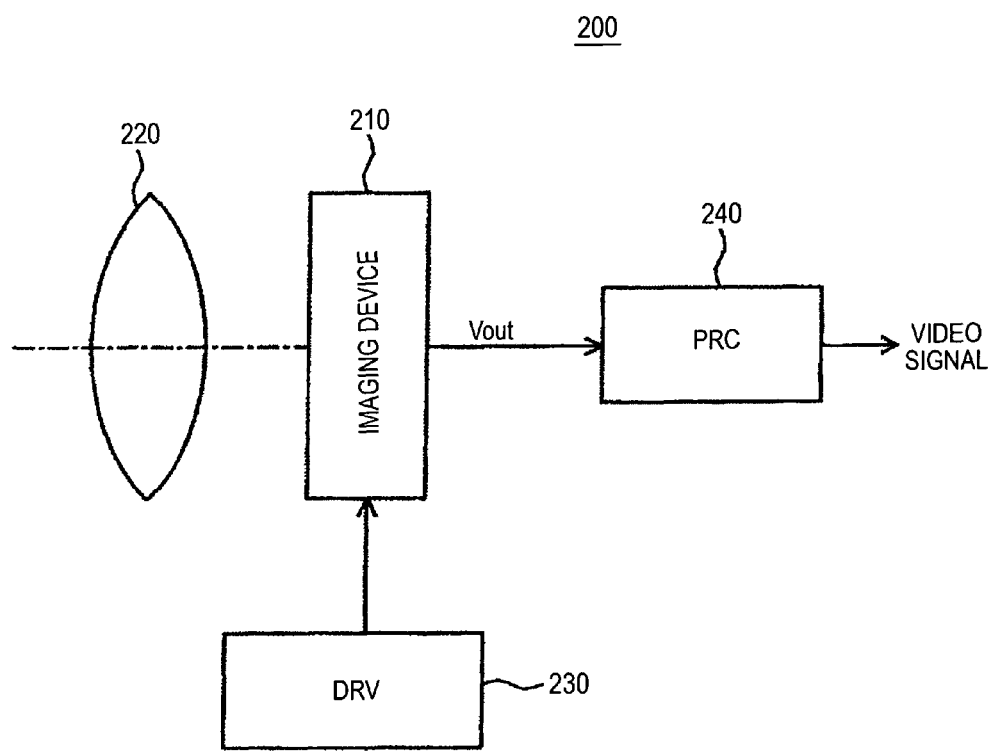
FIG. 7 is a view showing an example of a configuration of a camera system to which the solid-state imaging device according to an embodiment of the invention is applied.

FIG. 7 is a view showing an example of a configuration of a camera system to which the solid-state imaging device according to a third embodiment of the invention is applied.

A camera system 200 has an imaging device 210 to which the CMOS image sensor (solid-state imaging device) 100 according to the embodiment can be applied as shown in FIG. 7.

The camera system 200 includes an optical system introducing incident light to (imaging an object image on) a pixel region of the imaging device 210, for example, a lens 220 imaging incident light (image light) on an imaging surface.

The camera system 200 includes a drive circuit (DRV) 230 driving the imaging device 310 and a signal processing circuit (PRC) 240 processing output signals of the imaging device 210.

The drive circuit 230 includes a timing generator (not shown) generating various timing signals including a start pulse and a clock pulse driving circuits in the imaging device 210, driving the imaging device 210 by given timing signals.

The signal processing circuit 240 performs given signal processing to output signals of the imaging device 210.

Image signals processed in the signal processing circuit 240 are recorded in a recording medium such as a memory.

Image information recorded in the recording medium is hard copied by a printer and so on. The image signals processed in the signal processing circuit 240 are reproduced on a monitor including a liquid crystal display as moving images.

As described above, the above described solid-state imaging device 100 is mounted as the imaging device 210 in the imaging apparatus such as a digital still camera, thereby realizing a high-precision camera.

The present application contains subject matter related to that disclosed in Japanese Priority Patent Application JP 2010-104345 filed in the Japan Patent Office on Apr. 28, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a drain of a replica circuit transistor directly electrically connected to a drain of a first transistor;
   an electrode of a capacitor directly electrically connected to a source of the replica circuit transistor,
   a source of a load transistor directly electrically connected to a source of the first transistor;
   a vertical signal line directly electrically connected to a drain of the load transistor;
   a gate of the first transistor directly electrically connected to said drain of the first transistor;
   a gate of the load transistor directly electrically connected to said gate of the first transistor.

2. The solid-state imaging device according to claim 1, wherein said first transistor is of a first conductive type, said replica circuit transistor being of a second conductive type.

3. The solid-state imaging device according to claim 1, wherein said first transistor and said load transistor are of a same conductive type.

4. The solid-state imaging device according to claim 1, wherein said load transistor is an NMOS transistor.

5. The solid-state imaging device according to claim 1, wherein said first transistor is an NMOS transistor, said replica circuit transistor being of a PMOS transistor.

6. The solid-state imaging device according to claim 1, further comprising:
   a selection transistor configurable to provide an electrical connection and disconnection between an amplifier transistor and said vertical signal line.

7. The solid-state imaging device according to claim 6, further comprising:
   a floating diffusion directly electrically connected to a gate of the amplifier transistor.

8. The solid-state imaging device according to claim 7, further comprising:
   a reset transistor configurable to provide an electrical connection and disconnection between a power supply line and said floating diffusion.

9. The solid-state imaging device according to claim 7, further comprising:
   a transfer transistor configurable to provide an electrical connection and disconnection between a photoelectric conversion element and said floating diffusion.

10. The solid-state imaging device according to claim 1, further comprising:
    a gate of the replica circuit transistor directly electrically connected to said vertical signal line.

11. The solid-state imaging device according to claim 1, further comprising:
    a gate of the replica circuit transistor directly electrically connected to a source of a second transistor and to a drain of a third transistor.

12. The solid-state imaging device according to claim 11, wherein said first transistor and said second transistor are of a same conductive type.

13. The solid-state imaging device according to claim 11, wherein said first transistor and said third transistor are of a same conductive type.

14. The solid-state imaging device according to claim 11, wherein said second transistor and said third transistor are of a same conductive type.

15. The solid-state imaging device according to claim 11, further comprising:
    a gate of the second transistor directly electrically connected to said vertical signal line.

16. The solid-state imaging device according to claim 11, further comprising:
    a source of the third transistor directly electrically connected to said source of the first transistor.

17. The solid-state imaging device according to claim 11, further comprising:
    a gate of the third transistor directly electrically connected to a bias power supply.

18. The solid-state imaging device according to claim 1, further comprising:
    a current source directly electrically connected to said source of the replica circuit transistor.

19. The solid-state imaging device according to claim 1, further comprising:
    another electrode of the capacitor directly electrically connected to a reference potential.

20. The solid-state imaging device according to claim 19, wherein said source of the load transistor and said source of the first transistor are directly electrically connected to said reference potential.

21. A camera system comprising:
    the solid-state imaging device according to claim 1;
    an optical system configured to direct incident light onto said solid-state imaging device.

* * * * *